United States Patent [19]
Hernqvist

[11] 4,010,363
[45] Mar. 1, 1977

[54] LASER ALIGNMENT SYSTEM

[75] Inventor: Karl Gerhard Hernqvist, Princeton, N.J.

[73] Assignee: RCA Corporation, New York, N.Y.

[22] Filed: Oct. 31, 1975

[21] Appl. No.: 627,800

[52] U.S. Cl. .............................. 250/201; 219/201; 331/94.5 S; 331/94.5 T

[51] Int. Cl.² .......................................... G01J 1/20

[58] Field of Search ................ 331/94.5 S, 94.5 T; 219/200, 201, 209, 210, 358, 502; 250/215, 238, 234, 204, 201

[56] References Cited
UNITED STATES PATENTS

| | | | |
|---|---|---|---|
| 3,252,110 | 5/1966 | Gustafson et al. | 250/234 X |
| 3,528,206 | 9/1970 | Baird | 331/94.5 T X |
| 3,579,140 | 5/1971 | Anderson | 331/94.5 T |
| 3,588,737 | 6/1971 | Chow | 331/94.5 T |

*Primary Examiner*—David C. Nelms
*Attorney, Agent, or Firm*—Glenn H. Bruestle; George E. Haas

[57] ABSTRACT

A gas laser has a tube for producing a laser beam and a plurality of heaters around the tube. A detector responds to a misalignment of the laser sending a response to control circuits for the heaters. In response to detector's output, the heater control circuits regulate the heaters so as to heat selective portions of the tube. The tube bends due to the heat resulting in a realignment of the laser.

9 Claims, 3 Drawing Figures

LASER ALIGNMENT SYSTEM

BACKGROUND OF THE INVENTION

This invention relates to systems for maintaining the alignment of a laser beam and the mirrors in a laser tube.

It is desirable, in the manufacture of inexpensive gas lasers, to mount the laser mirrors directly on the ends of the laser tube. Problems, however, have arisen when this technique is used in the production of lasers which operate at relatively high temperatures. For example, helium cadmium lasers operate at about 300° C. Any assymmetry in a temperature distribution along the tube causes the tube to bend misaligning the mirrors and detuning the cavity.

SUMMARY OF THE INVENTION

A gas laser alignment system has a gas laser tube for producing a laser beam. A plurality of heaters extend longitudinally along the exterior of the tube and are spaced around the tube's axis. The heaters maintain the laser in proper alignment. If the laser becomes misaligned, the system heats selective portions of the tube. The selective heating results in the tube bending into realignment.

DETAILED DESCRIPTION OF THE INVENTION

Figure 1:
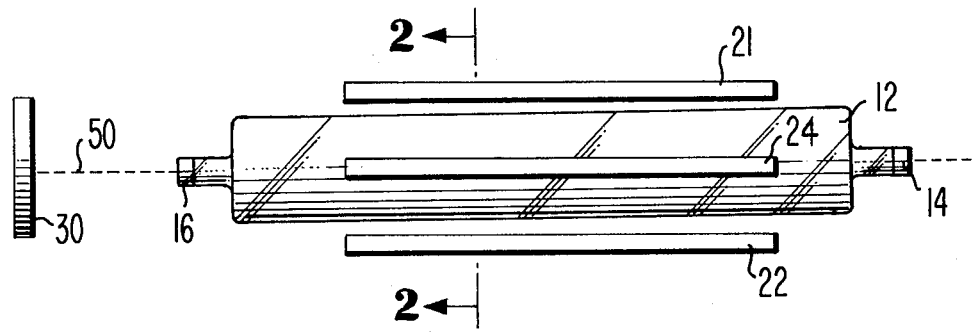
FIG. 1 is a plan view of the present alignment system.
Figure 2:
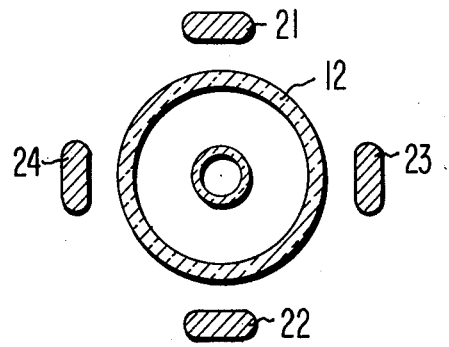
FIG. 2 is a cross sectional view taken on line 2—2 of FIG. 1.

With initial reference to FIG. 1, a system for aligning a laser has a laser tube 12 with a first and second partially reflective mirror, 14 and 16 respectively, at opposite ends of the tube. The laser beam output radiates from the end of the laser tube having the first partially reflective mirror 14. The second mirror 16 may have a higher reflectivity than the first mirror 14, so as to transmit only a small beam of light as compared with the output beam from the first mirror 14. Four heaters 21-24 extend longitudinally along the exterior of the tube. The heaters are spaced at 90° to one another around the circumference of the tube 12 as shown in FIG. 2. One end of the tube may be fixedly mounted to a support (not shown) while the other end is supported in a manner to allow expansion and contraction of the tube. Preferably the end with the first mirror 14 is fixedly mounted. A quadrant photodetector 30 is spaced from the end of the tube 12 having the second partially reflective mirror 16. The photodetector 30 is positioned so that the light output from the second mirror 16 strikes the center of the photodetector when the laser mirrors 14 and 16 are properly aligned.

Figure 3:
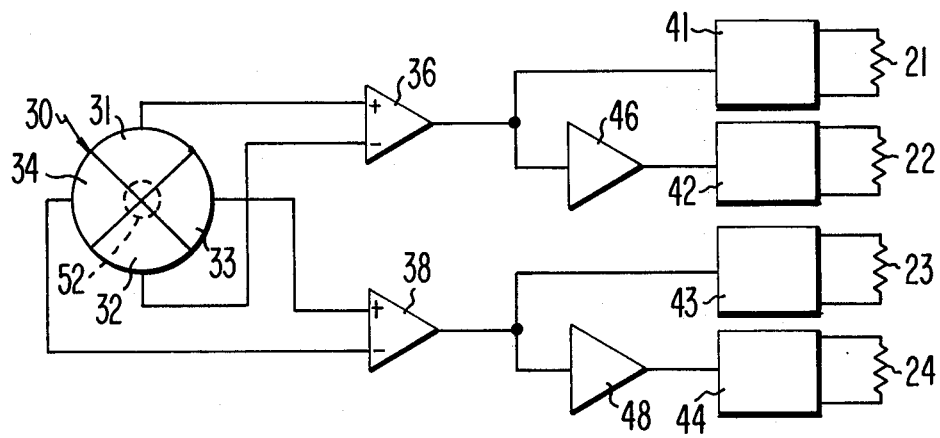
FIG. 3 is a block diagram of misalignment detection and heater control circuits.

With reference to FIG. 3, the photodetector 30 is divided into four sections or quadrants, 31-34. The first quadrant 31 is connected to the non-inverting input of a first differential amplifier 36. The second quadrant 32, which is opposite the first quadrant 21 is connected to the inverting input of the first differential amplifier 36. The output of the first differential amplifier 36 is connected to the input of a first heater control circuit 41. The first heater control 41 regulates the power of the heater in proportion to the magnitude of a positive input voltage. The heater control circuit may be any of several well known types, such as those shown in RCA Application Note AN-6096 by C. P. Knudsen, published in April, 1973. The first heater control 41 regulates the first heater 21. The output of the first differential amplifier 36 is also connected to first inverter 46. The first inverter 46 is connected to a second heater control 42 which controls the second heater 22. The third quadrant 33 is connected to the non-inverting input of a second differential amplifier 38 and the fourth quadrant 34 is connected to the inverting input of the second differential amplifier 38. The output of the second differential amplifier 38 is connected to a third heater control 43 which regulates the third heater 23. The output of the second differential amplifier 38 is also connected to a second inverter 48 whose output is connected to a fourth heater control 44. The fourth heater control 44 regulates the fourth heater 24.

When the laser tube 12 is operating the small beam of light 50, which is emitted from the second mirror 16, forms a dot of light 52 on the quadrant photodetector surface. When the laser is properly aligned the dot of light 52 will impinge the surface of the photodetector 30 in the center, falling equally on each of the four quadrants 31-34. Therefore, the signal from each quadrant to the first and second differential amplifiers 36 and 38 will be equal. Since there is no difference in the signals, there will be no output from either of the differential amplifiers 36 or 38. However, if the laser is not properly aligned, the dot of light 52 will not be centered and at least one of the quadrants will be illuminated more than the others.

For example, let us say that the dot of light 52 impinges the photodetector 30 below the center of the surface so that more light falls on the second quadrant 32 than upon the other quadrants. Let us also assume that the light impinging the third quadrant 33 is equal to the light impinging upon the fourth quadrant 34. Therefore, the signals emitted from both the third and fourth quadrants 33 and 34 will be equal. In this case, the signal from the second quadrant 32 will be much greater than the signal from the first quadrant 31 due to the greater amount of light falling upon the second quadrant. The signals from the first and second quadrants 31 and 32 will enter the first differential amplifier 36. Since the signal from the second quadrant 32 is larger, the signal at the inverting input of the first differential amplifier 36 will be greater than the signal at the noninverting input. The output of the first differential amplifier 36 will be a negative voltage of some magnitude proportional to the difference in the magnitude between the signals from the first and second quadrants 31 and 32. This first differential amplifier's output signal is then applied to the first heater control 41 and the first inverter 46. Since a positive voltage is required to trigger the heater control and since the output from the first differential amplifier is negative, the first heater control 41 will not respond to the differential amplifier output. However, the negative signal from the first differential amplifier 36 will be inverted by the first inverter 46 producing a positive output signal of the same magnitude as the input signal. This positive signal will then trigger the second heater control 42 which will turn on the second heater 22.

The power which is applied to the second heater 22 is proportional to the magnitude of the input signal to the second heater controller 42 which in turn is proportional to the difference between signals from the first and second quadrants 31 and 32. The second heater 22 will heat up the bottom side of the tube 12 as shown in FIG. 1. This heat, applied to only the bottom side of the tube 12, will cause that side to expand at a greater rate than the rest of the tube resulting in a bending of the tube. This bending causes the small beam 50 to be raised toward the center of the photodetector 30. As the beam nears the center of the photodetector 30, the difference in the output signals between the first and second quadrants 31 and 32 decreases. Hence the amount of power applied to the second heater 22 also decreases and the bending slows. The second heater 22 will be turned off when the dot of light 52 hits the center of the photodetector 30 and the signals from the first and second quadrants 31 and 32 again are equal.

Had the light impinging the photodetector been aimed toward the top of the photodetector so that the first quadrant 31 was illuminated more than the second quadrant, the signal from the first quadrant 31 would have been greater than the signal from the second quadrant 32. The output of the first differential amplifier 36, in this case, would have been positive triggering the first heater control 41 and not the second heater control 42. This would have activated the first heater 21 causing the tube 12 to bend in a downward direction.

In the foregoing example, the light impinging the third and fourth quadrants 33 and 34 was equal resulting in a zero output from the second differential amplifier 38 so that neither the third or fourth heaters 23 and 24 was activated. However, it is also conceivable that in addition to the light beam illuminating either the first or the second quadrant unequally, it may simultaneously illuminate either the third or fourth quadrant unequally. In this situation both, the first and the second differential amplifiers 36 and 38 will produce an output, resulting in two of the heaters being turned on to bend the tube so that the light beam is again centered on the photodetector surface.

Through the use of this laser system, the alignment of the mirrors and the positioning of the beam is controlled so that should the laser become misaligned, the system will realign the mirrors and the beam. The use of a circuit similar to that shown in FIG. 3 provides an automatic control for the plurality of heaters. It is readily apparent that the previously described system can operate with as few as three heaters or more than four heaters to provide a two dimensional positioning and alignment of the laser. The choice of four heaters and a quadrant photodetector results in the simplest system for automatic alignment using the heaters.

I claim:

1. A system for maintaining the alignment of a gas laser comprising:
    a gas discharge tube for producing a laser beam; and
    a plurality of heaters extending longitudinally along the exterior of the tube spaced around the tube's longitudinal axis for selectively heating the tube.

2. The system in claim 1 including means for detecting the misalignment of the laser.

3. The system in claim 2 including means for controlling the heaters to selectively heat various portions of the tube in response to the detection of the laser misalignment, the selective heating to bend the tube resulting in the realignment of the laser.

4. The system in claim 2 wherein the means for detecting the misalignment comprises a photodetector whose detecting surface is divided into various sections equal in number to the number of heaters, each of said sections for generating a separate output signal depending upon the amount of light impinging that section, the photodetector being positioned so that some of the light generated by the laser impinges the photodetector.

5. The system as in claim 4 wherein there are four heaters.

6. The system as in claim 5 wherein the photodetector is divided into quadrants.

7. The system as in claim 6 wherein the means for detecting the misalignment further comprises:
    a first and a second differential amplifier, two quadrants opposite to one another being connected to the inputs of the first differential amplifier, and the remaining two opposite quadrants being connected to the inputs of the second differential amplifier.

8. The system as in claim 7 including means for controlling the heaters comprising:
    a first, second, third and fourth heater controls each of which regulates a separate heater;
    a first and a second inverter; and
    the output of the first differential amplifier being connected to the first heater control and the first inverter, the first inverter output being connected to the input of the second heater control, the output of the second differential amplifier being connected to the inputs of the third heater control and the second inverter, the output of the second inverter being connected to the input of the fourth heater control.

9. The system as in claim 1 wherein the tube further comprises:
    a partially reflective mirror at each of the opposite ends of the tube.

* * * * *